Jan. 27, 1931.  F. BREITBACH  1,790,571
PROCESS OF EXTRACTING BENZENE HYDROCARBONS FROM GASES
Filed Nov. 21, 1928  2 Sheets-Sheet 2

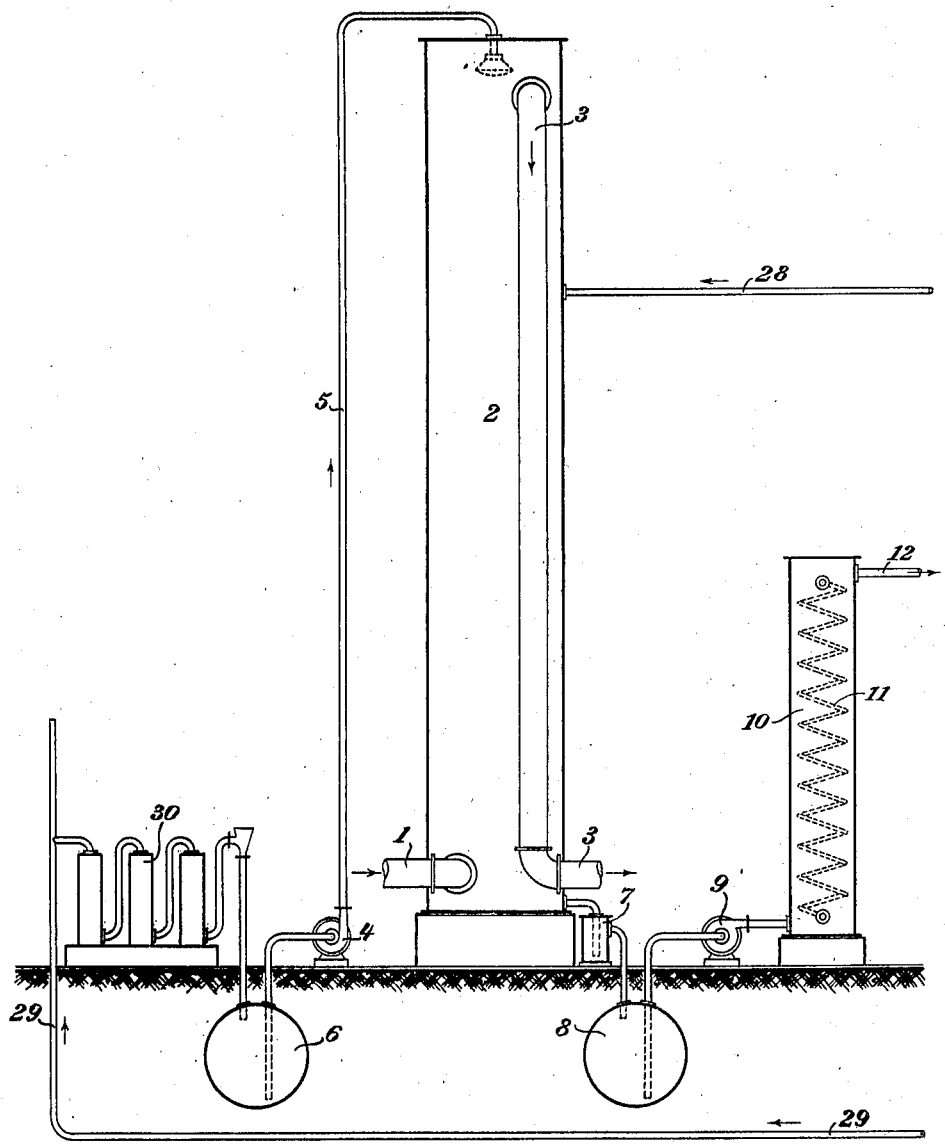

Fig. 1ª.

Inventor
Fritz Breitbach.

Patented Jan. 27, 1931

1,790,571

UNITED STATES PATENT OFFICE

FRITZ BREITBACH, OF RECKLINGHAUSEN, GERMANY, ASSIGNOR TO THE FIRM CARL STILL, OF RECKLINGHAUSEN, GERMANY

PROCESS OF EXTRACTING BENZENE HYDROCARBONS FROM GASES

Application filed November 21, 1928, Serial No. 320,880, and in Germany November 21, 1927.

My invention relates to certain improvements and modifications of the process of extracting benzene hydrocarbons from gases described and claimed in the specification of the application for Letters Patent of Theodor Schneider Ser. Nr. 290,888 which has been filed on July 6, 1928.

The process of the said co-pending application has the main feature that for the extracting of benzene hydrocarbons a wash oil of a comparatively high naphthalene content is used. When this process is performed, the distillation of the wash oil charged with benzene hydrocarbons will give the result that a portion of the naphthalene of the wash oil is also volatilized as a distillate. This naphthalene is, after separation by fractionation from the remaining light oil distillate, returned to the wash oil.

The present invention represents a particularly advantageous method of carrying out the process in question, especially the steps of distilling and fractionating mentioned before.

The invention will be more fully described with reference to the drawings, which represent in a somewhat diagrammatic manner a plant suitable for carrying out the process.

Fig. 1 and Fig. 1a, which is to be regarded as a continuation of Fig. 1, show a plant of this kind in a side elevation.

The cooled distillation gases from which the benzene hydrocarbons are to be recovered are admitted through a pipe 1 in the usual manner into the bottom of a vertical scrubbing tower 2 and are led away at the upper end, freed from their content of benzene, through a pipe 3. Instead of a single scrubber 2, as shown, a number of scrubbing towers connected in series may be used, as is usual in such installations. The filling of hurdles, checkerwork or the like arranged in the scrubbing tower 2 is sprinkled with debenzolized cooled wash oil taken from a tank 6 and forced by a pump 4 through a vertical pipe line 5. The wash oil, charged with benzene hydrocarbons, is discharged at the bottom of the tower 2 through a pipe 7 into a tank 8, from which it is drawn by a pump 9 into the distilling plant for being deprived of its benzene content.

The wash oil is first led, preferably after being preheated (which has been omitted in the drawing) in the usual manner by the distilled wash oil to be cooled or by the vapors distilled off and leaving the distillation apparatus, to a heater 10, in which it is raised to the requisite distillation temperature of about 130° C. by the indirect heat of a steam coil 11. In this heated condition it is led through a pipe 12 into the column 13 and is there freed from the absorbed benzene hydrocarbons and also from a portion of its naphthalene content by the direct injection of steam. The wash oil thus deprived of the content just mentioned, passes through the pipe 29 to a plant of indirectly acting coolers 30 wherein it is cooled, by means of water, to the normal temperature. The distilled vapors pass away from the top of the column 13 through a pipe 14 into a condenser 15, in the upper part of which they are condensed by means of cooling water. The resulting liquid condensate runs downwards and is separated into water and light oil in the lower part of the condenser 15. The water is discharged through a pipe 16 into the waste.

The liquid light oil obtained, which consists of a mixture of the benzene hydrocarbons taken up from the gas, some wash oil constituents and naphthalene, is led through a pipe 17 into a rectifying column 18. The lower part of this column is indirectly heated by steam supplied by the pipe 19; besides a direct steam supply 31 is provided. On the top of the column 18 a reflux condenser 20 is mounted. In this column 18 the light oil admitted through the pipe 17 is subjected to continuous fractionation. The distillation vapors led away through a pipe 21 consist of a mixture of benzene hydrocarbons, representing a high-grade benzene product, that is, a product of which at least about 95 to 98 per cent. distil over at temperatures up to 180° C. Of course, a benzene product of lower percentage content may be recovered, when desired, by suitably conducting the operation. The distillation vapors passing off through the pipe 21 are condensed in a condenser 22 of a construction similar to that of the aforesaid condenser 15. Since they contain a small amount of water vapor, a condensate consisting of water and benzene hydrocarbons is obtained, which is separated in the bottom part of the condenser 22. The water is removed through a pipe 23 to the waste, whilst the recovered high percentage benzene product is led through a pipe 24 into a storing tank (not shown).

At the bottom of the rectifying column 18, a hot liquid residue, consisting substantially of wash oil constituents, that is, oils boiling above 180° C., and of naphthalene, flows through a pipe 25 into a tank 26. In other cases, as it is usual and known in the recovery of benzene, this naphthalene-charged residue from the light oil rectification is cooled in open cooling pans, so as to separate the bulk of the naphthalene in a crystalline form, and to return the residual oil to the wash oil circulating in the plant. According to the present process however, this cooling of the naphthalene-charged rectification residue is omitted in order to leave the whole naphthalene in solution. The naphthalene-charged oil is delivered while still warm from the tank 26 by a pump 27 and pipe 28 into the scrubbing tower 2 and mixes with the wash oil which is being again passed through this gas scrubber.

It is preferred that the naphthalene-charged residual oil enters the scrubbing tower 2 at a point in the path of the gas which, as shown in the drawing, is located at a certain distance before, id est, below the position in which the gas is led away from the scrubbing plant through the pipe 3.

In plants which, as is usual and has been mentioned above, comprise a plurality of scrubbing towers arranged in series, the naphthalene-charged residual oil is preferably introduced into that wash oil tank which receives the effluent oil from that scrubbing tower traversed as the last by the gas and which directs it to the last tower but one of the series. This special positioning of the point where the residual oil is reintroduced into the circulation of the main stream of wash oil effects that the gas to be treated meets, at its exit from the scrubber plant, a fresh and absolutely pure wash oil, thereby ensuring the best extraction of the benzene hydrocarbons. The slightly higher temperature at which the naphthalene-charged residual oil is returned into circulation is practically of no importance, since the amount of this residual oil is very small, only about 1 per cent of the cooled wash oil passed through the scrubbing plant.

The introduction of the residual oil into the gas scrubbing plant at a point in the path of the gas which is situated at a certain distance before the gas exit, has the advantages that, on the one hand, any small content in the residual oil of low-boiling benzene hydrocarbons (benzene, toluene etc.) which may have been left in the residue after fractionation in the rectifying column 18, is regained without in any way disturbing the extraction of the benzene from the gases, and, on the other hand, this allowing of some benzene content in the rectification residue simplifies and facilitates the rectifying operation. This means:—since it is not necessary to ensure that the rectification residue is very completely freed from low-boiling constituents during the fractionation in the column 18, the operating of the column is considerably lightened and facilitated. In this manner it is possible to obtain a high degree of purity in the distillation vapors, i. e. a high-grade benzene product without excessive expenditure of labour and working materials, more particularly of heating steam. The process described is, therefore, particularly adapted to improve the continuous fractionation of the light oil in the recovery of benzene.

The process is not restricted to the employment of a continuously operated fractionation apparatus such as the column 18. Likewise, the naphthalene-charged residual oil from the rectification of the light oil in the usual intermittently operated rectification stills may be employed in the above-described manner in the recovery of benzene. When operating after the latter manner, the aforesaid advantages are likewise obtained.

What I claim is:—

1. In the process of extracting benzene hydrocarbons from gases by means of wash oil containing naphthalene, the combination of steps which comprises: distilling the benzene-charged wash oil so as to obtain a liquid distillate containing naphthalene, continuously rectifying the said distillate, and reconducting the liquid naphthalene-charged residue of the said rectifying operation while still warm to the main stream of wash oil circulating through the gas scrubbing plant.

2. In the process of extracting benzene hydrocarbons from gases by means of wash oil containing naphthalene, the combination of steps which comprises: distilling the benzene-charged wash oil so as to obtain a liquid distillate containing naphthalene, continuously rectifying the said distillate, and reconducting the liquid naphthalene-charged residue of the said rectifying operation while still warm to the main stream of wash oil circulating through the gas scrubbing plant at a point which is positioned at a certain distance before the gas exit from the scrubbing plant.

3. In the process of extracting benzene hydrocarbons from gases by means of wash oil containing naphthalene, the combination of steps which comprises: distilling the benzene-charged wash oil so as to obtain a liquid distillate containing napthalene, continuously rectifying the said distillate in a column still bearing a reflux condenser in such a manner that the out-going benzene vapors have the required high-grade composition while the outflowing liquid residue may be incompletely debenzolized, and reconducting the said liquid naphthalene-charged residue while still warm to the main stream of wash oil circulating through the gas scrubbing plant.

In testimony whereof I affix my signature

FRITZ BREITBACH.